(12) United States Patent
Kazin et al.

(10) Patent No.: US 7,662,227 B2
(45) Date of Patent: *Feb. 16, 2010

(54) CERAMIC PIGMENTS ON APATITE BASIS

(75) Inventors: Pavel E. Kazin, Moscow (RU); Andrei S. Karpov, Stuttgart (DE); Martin Jansen, Leonberg (DE)

(73) Assignee: Max-Planck-Gesellschaft zur Forderung der Wissenschaften e.V., Munich (DE)

( * ) Notice: Subject to any disclaimer, the term of this patent is extended or adjusted under 35 U.S.C. 154(b) by 11 days.

This patent is subject to a terminal disclaimer.

(21) Appl. No.: 11/932,259

(22) Filed: Oct. 31, 2007

(65) Prior Publication Data

US 2008/0075652 A1 Mar. 27, 2008

Related U.S. Application Data

(63) Continuation of application No. 10/519,532, filed as application No. PCT/EP03/06849 on Jun. 27, 2003, now Pat. No. 7,481,876.

(30) Foreign Application Priority Data

Jun. 28, 2002 (EP) .................................. 02014451
Aug. 30, 2002 (EP) .................................. 02019542

(51) Int. Cl.
*C01G 3/00* (2006.01)
*C01G 31/00* (2006.01)
*C01B 25/32* (2006.01)
*C04B 14/30* (2006.01)

(52) U.S. Cl. ................ 106/479; 106/480; 106/462; 106/461; 423/306; 423/311; 423/594.8

(58) Field of Classification Search ................ 106/479, 106/480, 462, 461; 423/306, 311, 594.8
See application file for complete search history.

(56) References Cited

U.S. PATENT DOCUMENTS 7,481,876 B2 * 1/2009 Kazin et al. ................. 106/462

OTHER PUBLICATIONS

Carrillo-Cabrera et al., "Pentastrontium Tris[tetraoxovanadata(V)] catena-Monoxocuprate(I), Sr5(VO4)3(CuO)-An Apatite Derivative with Inserted Linear 1[Cuo]1- Chains," Z. Anorg. Allg. Chem. 1999, 625, pp. 183-185, XP009017131.
Kazin et al., "Crystal Structure and Properties of Strontium Phosphate Apatite with Oxocuprate Ions in Hexagonal Channels," Z. Anorg. Allg. Chem., 2003, 629, pp. 344-352, XP009017125.
Patel et al., "Preparation and Characterization of Mixed (Ca+Ba+Cu) hydroxylapatites," J. Indian Chem. Soc., vol. 61, No. 10, 1984, pp. 906-907, XP009017132.

* cited by examiner

*Primary Examiner*—C. Melissa Koslow
(74) *Attorney, Agent, or Firm*—Sutherland Asbill & Brennan LLP

(57) ABSTRACT

The present invention relates to compounds on apatite basis, having the general formula $M_5(AO_4)_3X$ wherein X is situated in the hexagonal channels of the apatite structure and includes Cu-atoms, processes for the preparation thereof as well as applications of these compounds. The compounds presented herein are particularly useful as pigments.

10 Claims, 2 Drawing Sheets

CERAMIC PIGMENTS ON APATITE BASIS

CROSS REFERENCES TO RELATED APPLICATIONS

This application is a continuation of U.S. patent application Ser. No. 10/519,532, filed on Dec. 27, 2004, now U.S. Pat. No. 7,481,876 issued on Jan. 27, 2009, which claims the priority benefit of PCT/EP03/06849 filed on Jun. 27, 2003, which claims the priority benefit of European Application Nos. 02014451.5 filed on Jun. 28, 2002 and 02019542.6 filed on Aug. 30, 2002. These applications are incorporated herein by reference in their entirety.

DESCRIPTION

The present invention relates to compounds on apatite basis, processes for the preparation thereof as well as applications of these compounds. The compounds presented herein are particularly useful as pigments.

Ceramic pigments are widely used to impart color and/or opacity to artificial articles and are usually incorporated as fine particles in paints, plastics, and other materials. Although many chemical compounds are effectively applied as pigments there is still a need to find new compounds and mixtures which show bright colors and are relatively cheap, stable towards heating and light, chemically compatible with the materials, non-toxic and environment friendly.

A compound with approximate composition $Sr_5(VO_4)_3$(CuO) (1) has been synthesized and structurally characterized by W. Carrillo-Cabrera, H. G. von Schnering, Z. anorg. Allg. Chem. 1999, 625, 183. However the compound was colorless and contained copper in oxidation state +1 only. In the same paper an isostructural compound $(Sr_{0.9}Ca_{0.1})_5(Cr^VO_4)_3$(Cu$^I$O) is mentioned, the data for it being unpublished. A copper containing strontium vanadate has been described earlier by P. E. Kazin, M. A. Uskova, Yu. D. Tretyakov, M. Jansen, S. Scheurell, E. Kemnitz, Physica C 1998, 301, 185. But only the metal element ratio and the unindexed powder diffraction pattern have been reported then. So far, copper has been introduced in the phosphate apatites only in M position. The solid solution $(M_1-xCu_x)_5(PO_4)_3$OH, where M=Sr, Ca, as well as the fully substituted compound $CU_5(PO_4)_3$OH have been reported by M. Pujari, P. N. Patel, J. Solid State Chem. 1989, 83, 100. Besides, the phosphor $Sr_5(PO_4)_3$Cl doped by small amount of Cu as activator is known (Hunt, McKeag, J. Electrochem. Soc. 1959, 106, 1032).

Therefore, it was an object of the invention to provide new compounds on apatite basis, especially compounds which are brightly colored.

According to the invention this object is achieved by providing a compound having the general formula (I)

$$M_5(AO_4)_3X,$$

wherein the group $M_5(AO_4)_3$ forms an apatite structure and X is situated in the hexagonal channels of the apatite structure and includes Cu-atoms, with the proviso that the compound is not $Sr_5(VO_4)_3$(CuO), $Sr_5(VO_4)_3$(Cu$_{0.894}$O$_{0.952}$), or $(Sr_{0.9}Ca_{0.1})_5(Cr^VO_4)_3$(CuO).

In particular, the invention relates to new chemical compounds, processes of their preparations and applications. The compounds have apatite based structures with general composition $M_5(AO_4)_3X$ where M and A are different individual chemical elements or mixtures of elements appropriate to form the apatite structure.

In a preferred embodiment A represents P, V or a mixture thereof and M represents Ba, Sr, Ca or a mixture thereof. X represents different atoms in different quantity, situated in the hexagonal channels. Essential feature of the compounds is the presence of Cu, in particular, of Cu ions in the channels. Most preferably, the Cu ions form O—Cu—O linear units.

The compounds of the invention, in particular, compounds having $Cu^{2+}$ in an unusual two-fold coordination, are brightly colored from dark-blue through blue-violet to red-violet. The color shade can be regulated by using different M and A elements, the brightness can be increased or decreased by oxidizing or reducing the copper ions via annealing in atmosphere with different partial oxygen pressure. The compounds are stable in ambient conditions and toward heating above 1000° C. in air. The compounds with certain M, A and X are relatively cheap, non-toxic and environment friendly. The compounds are preferably applied as pigments for plastics, paints, cements and plasters.

The group X preferably has a charge of −1 and formally represents a certain fraction of $Cu^{2+}$, and/or $Cu^+$, and $O^{2-}$ ions mixed with anions such as OH$^-$, F$^-$, Cl$^-$, Br$^-$, and/or I$^-$. Most preferably, X represents $Cu_xO_yH_z$, wherein $0<x\leq 0.85$, $0\leq z<1$ and $0.5<y\leq 1$. More preferably, X represents $Cu_xO_yH_z$, wherein $0.1\leq x\leq 0.6$, in particular, $0.2\leq x\leq 0.5$.

Several samples of compounds of the invention were characterized by X-ray single crystal and powder diffraction, ICP-OES analysis, scanning electron microscopy with EDX analysis, IR and NMR spectroscopy, magnetic measurements, UV-VIS spectrometry (diffuse reflectance spectra).

In preferred embodiments the main new features of the compounds claimed in the invention are: (i) copper(II) exists in the hexagonal channels of the apatite structure and provides the bright color of the samples; or/and (ii) copper ions are present in the hexagonal channels of phosphate apatites and other compounds with apatite structure; or/and (iii) copper atoms as oxocuprate ions form a continuous solid solution in the hexagonal channels, optionally together with other anions. Essentially unexpected is the incorporation of copper-oxygen units in the place of hydroxyls in the well known phosphate apatites, as well as the presence of divalent copper in the channels in twofold coordination by oxygen atoms. According to (ii) copper ions in an oxidation state of +1, +2 or both, are in the channels of apatites. Examples of apatites are phosphate apatites as well as vanadate apatites. By selecting appropriate elements for A also apatite structures based on $SiO_4^{2-}$, $SiO_4^{4-}$ and $AsO_4^{3-}$ can be prepared.

It has been reported that in channels of the particular apatite $Sr_5(VO_4)_3$CuO long, ideally infinite, linear chains of $Cu_n O_{n+1}^{(n+2)-}$ are present. According to (iii) above Cu—O$^-$ units can be continuously substituted by anions present in apatites such as OH$^-$, F$^-$ or Cl$^-$ so that the long $[CuO]_n^{n-}$ chains are broken into short entities such as monomeric O—Cu—O$^{3-}$, O—Cu—O$^{2-}$, HO—Cu—O$^{2-}$ or oligomeric O—(Cu—O—)$_n$—Cu—O, wherein n is an integer from 1 to 10, preferably from 1 to 5, and more preferably from 1 to 3.

Compounds containing $Cu^{2+}$ and, in particular, compounds containing $Cu^{2+}$ as well as $Cu^+$ are brightly colored. They can be used, in particular, as pigments, e.g. as ceramic pigments.

Further, the compounds of the invention, in particular, compounds having only $Cu^+$ and no $Cu^{2+}$ in group X preferably can be used as intermediates. From these compounds colored substances can be obtained, e.g. by oxidation. To impart color or to enhance color it is often sufficient to oxidize only a small part of Cu(I) to Cu(II).

The compounds according to the invention can easily be prepared by mixing compounds comprising the elements M, A and X and thermally treating the mixture in a range of from 200 to 1700° C. to yield a compound of general formula (I).

The starting compounds preferably are employed in a ratio close to the desired stoichiometric ratio. The thermal treatment preferably takes place at 400 to 1500° C., more preferably from 700 to 1400° C. The thermal treatment can be performed for 0.01 to 60 h, more preferably from 0.1 to 30 h, and most preferably from 1 to 10 h. To enhance the yield of the desired compounds the thermal treatment can be performed with intermediate regrinding. Depending on the amount of $Cu^{2+}$ desired, the thermal treatment can be performed in an oxygen-containing atmosphere such as air or oxygen or in an oxygen-free atmosphere such as under argon, nitrogen or another protective gas. To enhance the amount of $Cu^{2+}$ present in the hexagonal channels of the apatite, an additional step can be performed comprising a thermal treatment of the compound in oxygen, inert gas atmosphere or vacuum at 500 to 900° C., preferably from 600 to 800° C. for 0.5 to 24 h, preferably from 2 to 12 h.

In a most preferred embodiment the process according to the invention comprises the steps:

(i) mixing of carbonates of M, $(NH_4)H_2PO_4$ and Cu compounds,
(ii) thermal treatment of this mixture in solid state in air at 600 to 850° C. for 1 to 5 h,
(iii) regrinding,
(iv) thermal treatment at 1100 to 1400° C. for about 1 to 24 h,
(v) cooling, and
(vi) regrinding.

The compounds $M_5(AO_4)_3X$ preferably can be prepared from mixtures of salts and oxides containing the required components in close to stoichiometric ratio by solid state reaction at about 700-1400° C., or by melting and solidification at about 1000-1700° C. The samples prepared in air contain simultaneously $Cu^+$ and $Cu^{2+}$ ions. Depending on the copper content and thermal treatment conditions separate linear O—Cu—O or/and condensed (-)O—Cu—O—Cu—O(-) units form in the hexagonal channels. The copper can be further oxidized by annealing in oxygen atmosphere or reduced by annealing in argon atmosphere or vacuum with a $Cu_2O$—CuO getter.

In particular, samples containing $Cu^{2+}$ exhibit an unexpectedly bright color for copper ions. The absorption spectra show overlapping bands in the visible region. They can be related to d-d electron transitions in linear O—Cu(II)—O units. The latter appear to be the first example of twofold coordinated divalent copper in the solid state. The color is changing from dark-blue for $Ba_5(PO_4)_3Cu_xOH_z$ through blue-violet for $Sr_5(PO_4)_3Cu_xOH_z$ till red-violet for $Ca_5(PO_4)_3Cu_xOH_z$. The brightest color is attained for x about 0.1-0.4. The color intensity is further increased by annealing the samples in oxygen at 600-800° C.

The compounds of the invention preferably are stable in air at ambient conditions, insoluble in water, and resistant to heating up to 1000° C. Compounds with M=Sr, Ca, A=P, and $X=CU_xOH_z$ are non-toxic. Among them, the compounds with M=Ca are very cheap and environment friendly, as they represent simply hydroxylapatite modified by inserting small amounts of copper into the hexagonal channels. Further, the compounds of the invention are stable in alkaline media due to the basic nature of hydroxylapatites.

The invention further relates to a pigment comprising a compound of the invention, in particular, a compound of general formula (I), wherein X comprises $Cu^{2+}$, more preferably, wherein X comprises $Cu^{2+}$ as well as $Cu^+$.

The compounds of the invention can be used as intermediates for preparation of colors as well as colored materials themselves. Therefore, they can be used, e.g. as pigments, paint or as coloring additives, e.g. in cements or plasters.

The following Figures and Examples illustrate this invention.

EXAMPLE 1

Preparation of $Sr_5(PO_4)_3Cu_xOH_y$, about 1-5 g.

$SrCO_3$, $NH_4H_2PO_4$ and CuO (all of 99.99%) were thoroughly ground and mixed in an agate mortar in a 5.05:3: x molar ratio, where x=0.01, 0.1, 0,2, 0.3, 0.4, 0.5, 0.6. The mixtures were heated stepwise at 600 and 850° C. for 32 h with intermediate regrindings. The powders were pressed in pellets, annealed in air at 1100° C. for 24 hours and air-quenched. The pellets were ground in an agate mortar to obtain fine powders.

Figure 1:
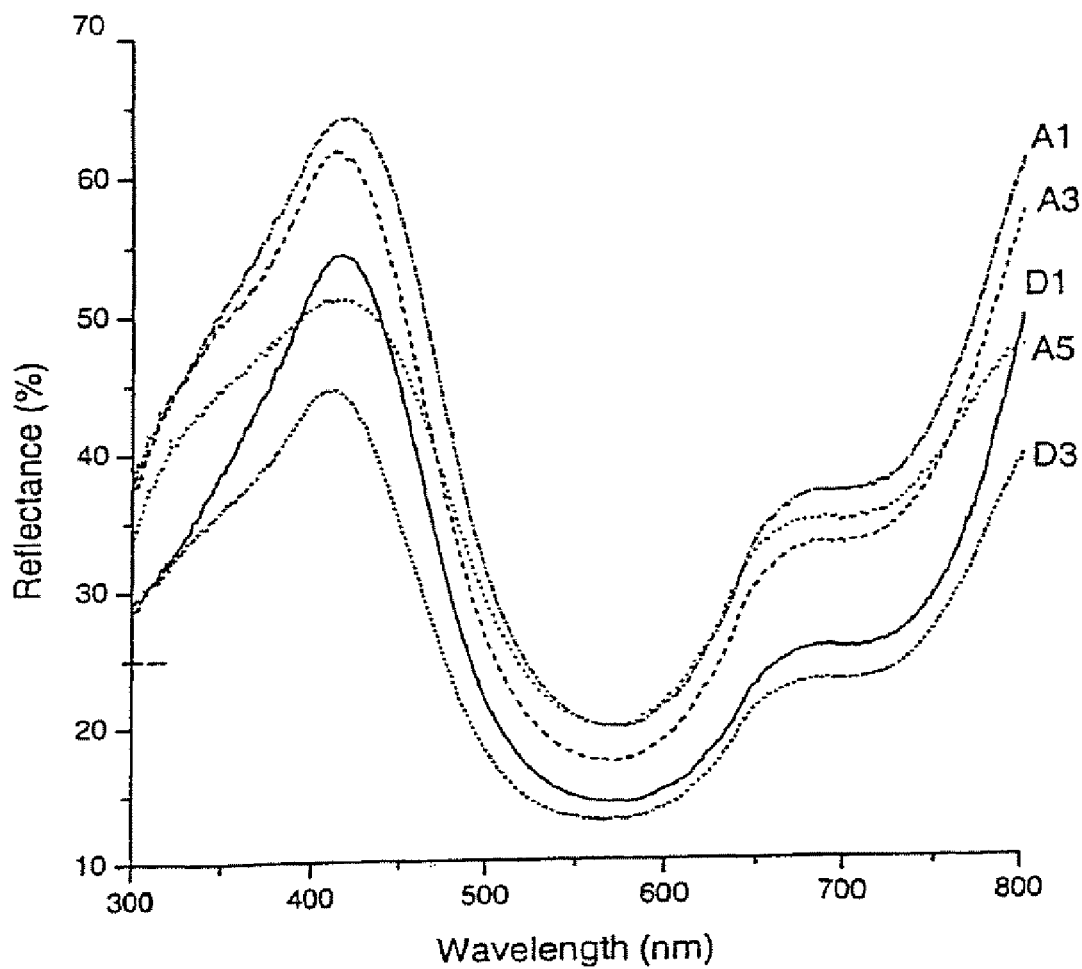
FIG. 1 shows diffuse reflectance spectra of the samples of Example 1. $Sr_5(PO_4)_3Cu_xOH_y$; as prepared: A1, x=0.1, A3, x=0.3, A5, x=0.5; annealed in oxygen at 800° C.: D1, x=0.1, D3, x=0.3.

X-ray diffraction patterns correspond to almost single phase apatite (about 97% for x=0.01 and >99% for the other x). Rietveld structure refinement have confirmed the copper to be situated in the hexagonal channels. Infrared spectra testify presence of OH groups with very weak hydrogen bonds. The samples are blue-violet in color, deepening with increasing x. The diffuse reflectance spectra are shown in FIG. 1. Two overlapping lines are observed in the visible region. The samples with x=0.1 and 0.3 were further annealed in oxygen flow at 800° C. for 2 hours. By this treatment, the intensity of the absorption lines has been increased.

EXAMPLE 2

Preparation of $Sr_5(PO_4)_3Cu_{0.3}H_y$, 5 kg.

20 moles rough crystalline $NH_4H_2PO_4$ and 33.67 moles $SrCO_3$ were thoroughly ground and mixed for 1 hour in a mill. A water solution of 2 moles $Cu(NO_3)_2*2.5H_2O$ was added and the components were mixed for 1 hour again. The mixture was annealed stepwise at 600° C. and 1200° C. for total time of about 36 hours with an intermediate regrinding and air quenched.

The powder obtained is bright blue-violet in color.

EXAMPLE 3

Preparation of $Sr_5(PO_4)_3Cu_{1/3}O_{2/3}$, about 1 g.

The sample (about 0.5 g) with x=1 prepared as in Example 1 was arc-melted on a copper plate in air at about 1700° C. for about 1-2 minutes and air quenched. The sample is blue-violet in color and contains >98% of apatite phase.

EXAMPLE 4

Preparation of $M_5(PO_4)_3Cu_{0.3}OH_y$, Where M is Ca or Ba, about 1-5 g.

$MCO_3$, $NH_4H_2PO_4$ and CuO (all of 99.99%) were thoroughly ground and mixed in an agate mortar in a 5.05:3:0.3 molar ratio. The mixtures were annealed stepwise at 600, 850° C. and 1100° C. for total time of about 60-80 hours with intermediate regrindings and air quenched.

Figure 2:
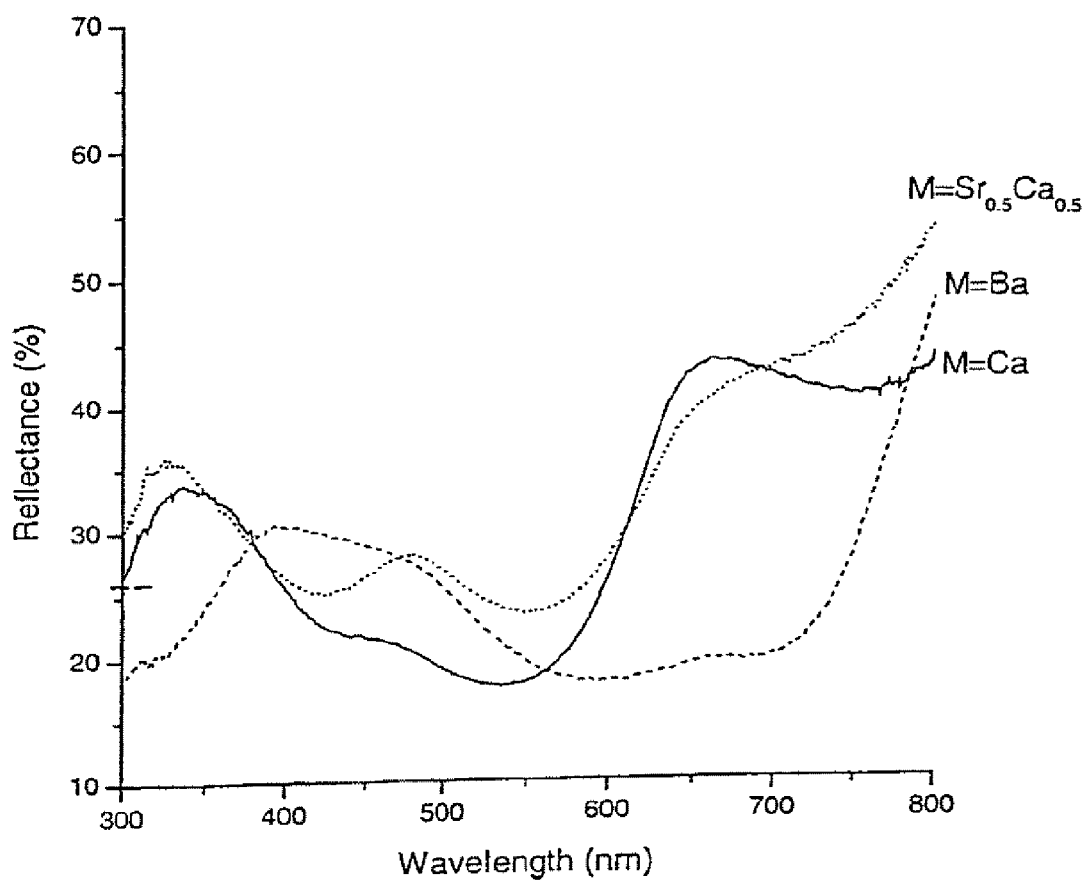
FIG. 2 shows diffuse reflectance spectra of the samples of Example 4 and Example 5, $M_5(PO_4)_3Cu_{0.3}OH_y$.

The sample with Ca is red-violet in color, and the one with Ba is dark-blue. The corresponding diffuse reflectance spectra are shown in FIG. 2.

EXAMPLE 5

Preparation of $Sr_{2.5}M'_{2.5}(PO_4)_3Cu_{0.3}OH_y$.

The same preparation procedure as in Example 4 but instead of M'CO$_3$ an equimolar mixture of SrCO$_3$ and M'CO$_3$ was used.

The samples have intermediate colors between these of the samples of Example 2 and Example 4. The diffuse reflectance spectrum of the sample with M'=Ca is shown in FIG. 2.

EXAMPLE 6

Preparation of $M_5(VO_4)_3Cu_{0.3}O_{1-z}H_y$, Where M is Sr or Ca.

The same preparation procedure as in Example 4, but ½ V$_2$O$_5$ was taken instead of NH$_4$H$_2$PO$_4$.

As obtained apatite phases have gray-blue-violet (M=Sr) or light-gray-green (M=Ca) colors.

EXAMPLE 7

Preparation of $M_5(PO_4)_3Cu_x(O,X)_yH_z$, Where M is Ca or Sr, X is F or Cl.

The same preparation procedure as in Example 4, but 0.2-0.7 mol of NH$_4$X was added to the initial mixture.

The samples show colors ranging from pink to blue-violet.

EXAMPLE 8

Preparation of $Sr_5(PO_4)_3Cu_{0.3}OH_y$, ca. 250 g.

1 mole NH$_4$H$_2$PO$_4$ and 1.68 mole SrCO$_3$ were thoroughly ground and mixed for 1 hour in a mill. A water solution of 0.1 mole Cu(NO$_3$)$_2$*2.5H$_2$O was added and the components were mixed for 1 hour again. The mixture was annealed stepwise at 600° C. and 1100° C. for total time of about 24 hours in a rotary kiln (Al$_2$O$_3$ tube, d$_i$=12 cm, l=50 cm, rotation speed 1 min$^{-1}$). Thereafter the furnace tube was inclined so that by rotation the powder came down and fell into a cold container. After cooling, the powder collected in the container was reground.

The powder obtained is bright blue-violet in color.

EXAMPLE 9

Preparation of $Sr_5(PO_4)_3Cu_{0.3}OH_y$, 1-10 g.

SrCO$_3$, NH$_4$H$_2$PO$_4$ and Cu(NO$_3$)$_2$*2.5H$_2$O (all of 99% purity) were thoroughly ground and mixed in an agate mortar in a 5.05:1:0.3 molar ratio. The mixture was heated at 600° C. for 6 hours. Then the reground mixture was placed in a tube furnace equipped with different operating atmosphere modes and heated in an air-flow at 1100° C. for 3 hours. Thereafter the working temperature was decreased to 1000° C., the operating atmosphere was changed to dry-air, and the mixture was further cooled down to room temperature. The rate of cooling steps in both cases was programmed to be 200° C./h.

The powder is bright blue-violet.

EXAMPLE 10

Preparation of $Sr_5(PO_4)_3Cu_{0.3}OH_y$, 1-10 g.

The same preparation procedure as in Example 9, but after changing atmosphere to dry-air the furnace was switched off.

The sample is bright blue-violet.

EXAMPLE 11

Preparation of $Sr_5(PO_4)_3Cu_{0.3}OH_y$, about 1-10 g.

The same preparation procedure as in Example 9, but with an extra post-annealing of the mixture in an oxygen flow at 600° C. for 2 hours.

The color of the sample is the same as in Example 9, but brighter.

EXAMPLE 12

Preparation of $Sr_5(PO_4)_3Cu_{0.3}OH_y$, about 1-10 g.

The same preparation procedure as in Example 9, but the cooling of the mixture in dry-air was performed only down to 600° C., afterwards the operating atmosphere was changed to oxygen, the mixture was heated at 600° C. for 2 hours, and further cooled down to room temperature.

The color of the sample is the same as in example 9, but brighter.

The invention claimed is:

1. A process for preparing a compound having the general formula M$_5$(AO$_4$)$_3$X, wherein M represents Ba, Sr, Ca or a mixture thereof and A represents P, V or a mixture thereof, and wherein the group M$_5$(AO$_4$)$_3$ forms an apatite structure and X is situated in the hexagonal channels of the apatite structure and includes Cu-atoms, with the proviso that the compound is not Sr$_5$(VO$_4$)$_3$(CuO), or Sr$_5$(VO$_4$)$_3$(Cu$_{0.894}$O$_{0.952}$), the process comprising the steps of:
   (i) mixing of compounds comprising the elements M, A and X;
   (ii) a first thermal treatment of the mixture in the range of 200 to 1700°C., wherein the thermal treatment is performed in ambient air; and
   (iii) a second thermal treatment of the mixture in the range of 500 to 900°C.

2. The process according to claim 1, wherein the first thermal treatment is performed for 0.01 to 60 hours.

3. The process according to claim 1, wherein the first thermal treatment is performed when intermediate regrinding.

4. The process according to claim 1, further comprising, after the second thermal treatment, (a) air quenching or (b) substituting the ambient air with dry air and slow cooling of the sample.

5. The process according to claim 1, wherein the second thermal treatment is performed for 0.5 to 24 hours.

6. The process according to claim 1, further comprising oxidizing the mixture in an oxygen atmosphere.

7. The process according to claim 1, further comprising reducing the mixture in an argon atmosphere or vacuum with a Cu$_2$O—CuO getter.

8. A compound having the general formula M$_5$(AO$_4$)$_3$X, wherein M represents Ba, Sr, Ca or a mixture thereof and A represents P, V or a mixture thereof, and wherein the group M$_5$(AO$_4$)$_3$ forms an apatite structure and X is situated in the hexagonal channels of the apatite structure and includes Cu-atoms, and X represents oxocuparate ions in the form of a continuous solid solution, with the proviso that the compound is not Sr$_5$(VO$_4$)$_3$(CuO), or Sr$_5$(VO$_4$)$_3$(Cu$_{0.894}$O$_{0.952}$).

9. The compound of claim 8, wherein X further represents oxocuparate ions substituted by anions selected from the group of OH$^-$, F$^-$, and Cl$^-$ such that the oxocuparate ions include monomeric O—Cu—O$^{3-}$, O—Cu—O$^{2-}$, HO—Cu—O$^{2-}$ or oligomeric O—(Cu—O—)$_n$—Cu—O, wherein n is an integer from 1 to 10.

10. The compound of claim 8, wherein A further includes Si-atoms or As atoms.

\* \* \* \* \*